United States Patent [19]

Yoshida et al.

[11] Patent Number: 5,110,399

[45] Date of Patent: May 5, 1992

[54] HEAT-CUTTING/BONDING BLADE AND HEAT-BONDING APPARATUS

[75] Inventors: Yoshinori Yoshida; Makoto Hagihara, both of Yamaguchi, Japan

[73] Assignee: Mitsui Petrochemical Industries, Ltd., Tokyo, Japan

[21] Appl. No.: 440,192

[22] Filed: Nov. 22, 1989

[30] Foreign Application Priority Data

| Nov. 22, 1988 | [JP] | Japan | 63-152009 |
| Dec. 16, 1988 | [JP] | Japan | 63-163088 |
| Dec. 16, 1988 | [JP] | Japan | 63-163089 |
| Jan. 23, 1989 | [JP] | Japan | 1-6250 |
| Jan. 30, 1989 | [JP] | Japan | 1-9633 |

[51] Int. Cl.$^5$ .................................... B32B 31/18
[52] U.S. Cl. ........................ 156/515; 156/518; 156/530
[58] Field of Search ............ 156/251, 515, 518, 530; 493/194, 199, 203, 206, 207, 208, 209

[56] References Cited

U.S. PATENT DOCUMENTS

| 3,513,052 | 5/1970 | Ariyasu et al. | 156/251 |
| 3,574,039 | 4/1971 | Fehr et al. | 156/251 |
| 3,735,673 | 5/1973 | Sheehan et al. | 493/203 |
| 3,874,976 | 4/1975 | MacFarland | 156/530 |
| 4,300,977 | 11/1981 | Schulze | 156/515 |
| 4,352,703 | 10/1982 | Perron | 156/515 |
| 4,743,333 | 5/1988 | Forthmann | 156/530 |

FOREIGN PATENT DOCUMENTS

| 1923517 | 11/1969 | Fed. Rep. of Germany | 493/203 |
| 2337038 | 7/1977 | France | 493/203 |
| 1264568 | 2/1972 | United Kingdom | 156/515 |

Primary Examiner—Caleb Weston
Attorney, Agent, or Firm—Sherman and Shalloway

[57] ABSTRACT

The invention provides a heat-bonding blade and a heat-bonding apparatus capable of heat-bonding thermoplastic resin sheets, in particular non-woven cloth sheets of thermoplastic resin, with or without heat-cutting these sheets. A first-type heat-bonding blade intended for heat-cutting/bonding has pressing members provided on both sides of the blade. The distance between the lower end of each pressing member and the edge of the blade is determined such that the pressing members lightly press the sheets of the thermoplastic resins when the edge of the blade has pressed into the sheets.

A second-type heat-bonding blade intended only for heat-bonding the sheets is provided with a contact surface on the edge thereof. The contact surface is embossed so as to have a multiplicity of emboss projections. This type of heat-bonding blade may be formed by removing the pressing members from the blade of the first type and providing an embossed contact surface on the edge of the same. The heat-bonding apparatus of the invention employs one of these types of heat-bonding blade of the invention.

18 Claims, 5 Drawing Sheets

FIG.15 FIG.16
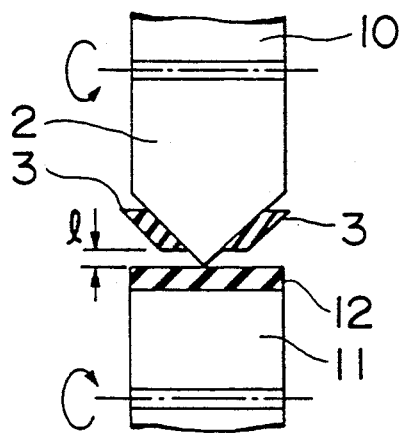
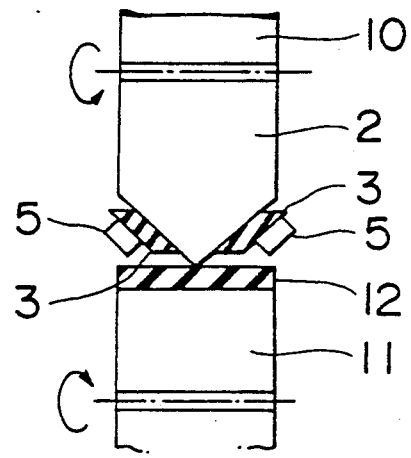
FIG.17
FIG.21
PRIOR ART
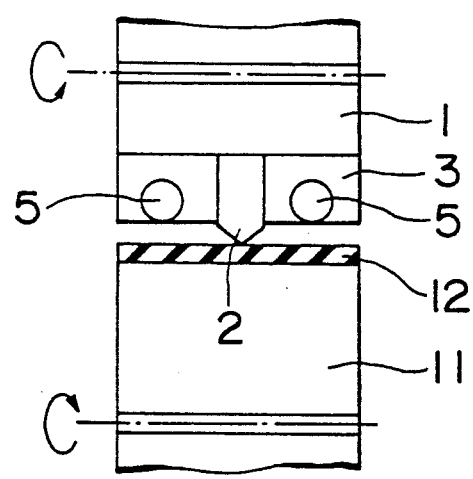
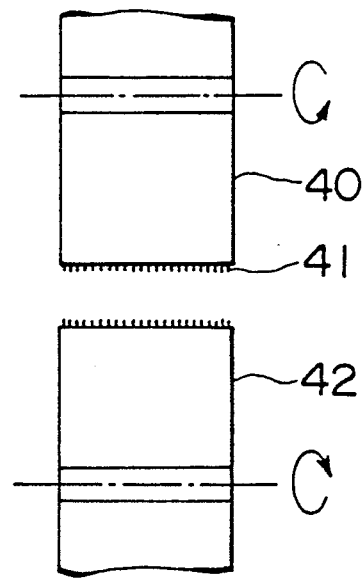

HEAT-CUTTING/BONDING BLADE AND HEAT-BONDING APPARATUS

BACKGROUND OF THE INVENTION

The present invention relates to a heat cutting/bonding blade apparatus for heat-cutting two or more sheets of thermoplastic resin, particularly non woven cloth sheets of a thermoplastic resin, laminated one on another, and thermally welding the cut edges of these sheets. The invention also is concerned with a heat bonding apparatus which can heat-bond superposed sheets of thermoplastic resin without cutting them.

A known heat cutting/welding blade, capable of thermally heat-cutting superposed non-woven cloth sheets of a thermoplastic resin and heat-bonding the cut edges of the sheets, employs an isosceles triangular cutting edge portion which is heated by, for example, an electrical heating coil. The cutting edge is advanced into the layers of the thermoplastic resin sheets while cutting these sheets and thermally fusing the cut edges so as to heat-bond the superposed sheets.

On the other hand, a heat-bond blade has been known which is capable of pressing an end surface of a heated plate to sheets to be welded so as to fuse and bond both sheets without cutting them. This type of welding blade apparatus can perform heat-seal of non-woven cloth sheets formed by film-laminate process.

A heat-bonding apparatus having the following features also has been known for heat-bonding sheets without cutting. This known apparatus is intended for use in forming a sack by welding non-woven cloth sheets formed by thermoplastic resin. As shown in FIG. 21, this known apparatus employs a disk-shaped heat-bonding blade 40 which is knurled at its peripheral surface as at 41. This heat-bonding blade 40 is adapted for cooperating with an anvil roll 42 having a similar structure. In use, the heat-bonding blade 40 is heated by means of, for example, an electric heater coil. The welding blade 40 is then made to roll on the sheets of the thermoplastic resin so that the superposed sheets are heated and fused so as to be welded together.

This known heat-bonding blade apparatus has the following problems. Namely, when this known apparatus is used for the purpose of melt-cutting and bonding of non-woven cloth sheets of polypropylene, the bonded portion usually exhibits inferior appearance and low bonding strength. Namely, the processing conditions for obtaining both good appearance and high bonding strength are extremely limited, and only well skilled persons could conduct the processing under such restricted conditions. In addition, the production efficiency was extremely low.

In order to avoid this problem, it has been a common measure to laminate a film having high bondability, e.g., a polyethylene film, to the non-woven cloth of the polypropylene sheet, so as to enable an easy cutting and sealing. This countermeasure is quite uneconomical.

Another problem encountered with the conventional heat-bonding blade apparatus is that the bonding strength is insufficient when three or more layers are superposed and heat-sealed, though this known apparatus provides appreciable cutting and bonding effect when used for a pair of sheets. This problem is serious particularly when a non-woven cloth sheet is used as one of the constituent elements of the laminated sheet structure.

Furthermore, the known heat-bonding blade apparatus could not provide acceptable appearance and bonding strength when used for heat-bonding a pair of sheets of non-woven cloths which have no film laminated thereon.

SUMMARY OF THE INVENTION

In order to overcome the above-described problems of the prior art, the present invention is aimed at the following first to fourth objects.

The first object of the present invention is to provide a heat cutting/bonding blade which is capable of heat-cutting and bonding superposed sheets of thermoplastic resin, particularly non-woven cloth sheets of polypropylene, or three or more sheets of thermoplastic resin superposed one on another.

The second object of the present invention is to provide a non-cutting heat-bonding blade which can bond sheets of thermoplastic resin, in particular sheets of nonwoven cloth, with an attractive appearance and high strength of the welded portion.

The third object of the present invention is to provide a heat-bonding apparatus which can selectively and continuously conduct bonding of sheets of thermoplastic resin, particularly non-woven cloths of polypropylene, or a laminate sheet structure having three or more sheets, with or without heat-cutting of the sheets.

The fourth object of the present invention is to provide a non-cutting heat-bonding apparatus in which sheets of a thermoplastic resin are bonded by means of a heat-bonding blade which is capable of bonding the sheets while heat-cutting the sheets.

The present invention provides a heat-bonding blade having a blade member, a heater for heating the blade member and a pressing member provided at least on one side of the blade member along the edge. The distance between the lower end of the pressing member and the cutting edge is determined such that the pressing member can lightly press the thermoplastic resin sheets to be heat-bonded, when the cutting edge has cut into engagement with the thermoplastic resin sheets, so that the pressing member is pressed onto the surface of the sheets so as to apply a predetermined level of pressure to the sheets.

The pressing member may be provided in duplicate: namely, one on each side of the blade member. Such an arrangement will produce a greater effect in pressing and fixing the sheets. The arrangement having the pressing member only on one side of the blade member is suitable for use in the case where the edges of the sheets are to be bonded.

The pressing member, which is provided on one or each side of the blade member, is preferably made of a heat-resistant elastic material.

Examples of such a heat-resistant elastic material are heat-resistant rubber, heat-resistant elastomer, heat-resistant elastic foam or the like. Such an elastic material used as the pressing member will provide a greater effect in pressing and fixing the sheets.

It is also possible to arrange such that the pressing member made of a heat-resistant material is mounted for movement towards and away from the cutting edge and urged by a suitable urging means such as a spring towards the cutting edge of the blade. In such a case, a metallic plate, ceramics plate or the like member can be used as the heat-resistant member.

Preferably, the pressing member is cooled by a suitable cooling means. The cooling means may be a pipe or the like member laid along the pressing member and capable of passing a cooling heat medium such as water. The provision of such a cooling means is essential when the pressing member is a metal plate. However, when a heat-resistant rubber or a ceramics is used as the material of the pressing member, the cooling means may be dispensed with if the pressing member exhibits so small heat conductivity that the sheets are not molten when the pressing member is pressed onto the sheets.

Any other type of cooling means, capable of externally cooling the pressing member or internally by circulating water or the like medium inside the pressing member, may be used in place of the above-described type of cooling means.

It is considered that the cooling of the pressing member by means of the cooling means makes it possible to avoid defects such as uneven cooling of the molten resin, variation of direction of contraction and so forth (such unevenness and variation are serious particularly when the sheets are non-woven cloths), during solidification of the portions fused and heat-bonded by the heat-cutting/bonding blade, thus stabilizing the state of cooling and contraction of the sheet.

It is possible to arrange such that the pressing member is movable towards and away from the cutting edge and means are provided for fixing the pressing member at a desired position. Such an arrangement enables the distance between the lower end of the pressing member and the cutting edge to be set in accordance with the thickness of the laminate sheet structure to be bonded.

The heat-bonding blade of the present invention may be carried out either as a heat-cutting/bonding blade capable of heat-cutting two or more superposed sheets and heat-bonding the thus cut sheets (referred to as "first-type heat-bonding blade" hereinafter) or as a non-cutting/bonding blade (referred to as "second-" or "third-type heat-bonding blade apparatus") which merely heat-bonds laminated sheets without cutting them.

The first-type heat-bonding blade, capable of both cutting and bonding sheets, is preferably constructed as follows.

When the sheets to be heat-cut are thermoplastic resin films, the blade member has a cutting edge of an angle preferably ranging between 25 and 35 degrees. When the sheets are non-woven cloth sheets, in particular spun-bond non-woven cloth of polypropylene, the cutting edge has an angle of 60 to 80 degrees, preferably $65 \pm 3$ degrees.

It is also possible to effect a rounding work on the edge of the blade member.

The first-type heat-bonding blade of the invention is suitable for heat-cutting and bonding of laminated sheets in which one or both of the sheets to be bonded are non-woven cloth, in particular spun-bond non-woven cloth of polypropylene. Obviously, the blade member of the first-type heat-bonding blade has to be heated to a temperature higher than the melting temperature of the thermoplastic resin sheets to be bonded. Thus, the temperature to which the blade member is to be heated is suitably determined and changed in accordance with the sheet material to be bonded.

It is also preferred that an anvil (lower blade member) for carrying the thermoplastic resin sheet to be cut is heated too. The temperature to which the anvil (lower blade) is to be heated, however, must be lower than the melting point of the thermoplastic resin sheets to be bonded.

It is considered that the cooling of the pressing member by means of the cooling means makes it possible to avoid defects such as uneven cooling of the molten resin, variation of direction of contraction and so forth (such unevenness and variation are serious particularly when the sheets are non-woven cloths), during solidification of the portions fused and heat-bonded by the heat-cutting/bonding blade, thus stabilizing the state of cooling and contraction of the sheet.

The operation of the first-type heat-bonding blade of the present invention capable of heat-cutting thermoplastic resin sheets is as follows. When two or more superposed sheets of thermoplastic resin are heat-cut by the heat-bonding blade of the invention, the edge of the blade member cuts into the laminate of the sheets. In this state, the lower edge of the pressing member is pressed onto the upper surface of the upper sheet along the line of cut. As explained before, the distance between the lower end of the pressing member and the edge of the blade member is so determined that the pressing member lightly presses the thermoplastic resin sheets when the edge of the cutting blade has cut into the sheets. The sheets, therefore, have not been cut when the lower end of the pressing member is brought into contact with the upper surface of the sheet to be cut. A further downward movement of the blade member causes the pressing member to lightly press the superposed sheets, while the edge of the blade member cuts these sheets. At the same time, the cut edges of the sheets contact the adjacent side surface of the blade member, whereby the sheets are thermally heated and bonded together.

The second-type of heat-bonding blade, which is designed to bond thermoplastic resin sheets without cutting them, is preferably constructed as follows.

The blade member of this blade has a contact surface capable of contacting with the surface of the upper one of the thermoplastic resin sheets to be bonded.

The contact surface is provided on the edge of the blade member and may be flat or, alternatively, embossed so as to have projections. In the latter case, the bond surface ratio, which is determined by the following formula, preferably ranges between 20 and 90%, more preferably between 30 and 60%.

$\{$(Total area of emboss projections)/(area of contact surface)$\} \times 100$

Any value of the bonding area ratio below 20% cannot provide sufficient bonding strength so that a sack formed from the bonded sheets will exhibit an impractically low level of hermetic sealing power. On the other hand, a value of the bonding area ratio not greater than 90% will impair the advantage of the embossing because in such a case, the embossed contact surface is regarded as being material equivalent to the smooth surface. The emboss projection can have conical or pyramidal form of triangular, square or other polygonal cross-section. The emboss projections may be arranged along the cutting edge or at an inclination to the cutting edge.

In the second-type heat-bonding blade of the present invention, it is necessary that the blade member is heated to a temperature above the melting point of the thermoplastic resin sheet. The temperature should be changed in accordance with the type of the sheets to be bonded.

Pressing of the blade member of the second-type heat-bonding blade onto two or more thermoplastic resin sheets superposed one on another, the contact surface of the cutting edge is pressed to depress the sheet surface. Meanwhile, the lower edge of the pressing member is pressed onto the portion of the sheet along the edge of the blade. In consequence, the contact surface of the cutting edge of the blade member heats and melts the sheets so as to bond these sheets together. Since the sheets are pressed by a pressing member, the molten resin does not flow nor spread laterally. When the contact surface has emboss projections, the projections transmit heat so as to heat-bond the sheet, while other portions press and hold the sheet to maintain the shape of the sheets.

In the third-type heat-bonding blade of the present invention which is intended for bonding sheets without cutting, the construction may be as follows. Namely, this type of blade employs a blade member which is capable of being heated by a heater and which is provided on the edge thereof with a contact surface similar to that of the second-type apparatus. The contact surface is embossed to have emboss projections. In other words, the non-cutting heat-bonding blade of the third type does not essentially require the pressing member.

When the blade member of the third-type heat-bonding blade devoid of a pressing member is pressed onto two or more sheets of the thermoplastic resin superposed one on another, the contact surface of the edge of the blade member is pressed into the superposed sheets so that the sheets are molten by the heat from the contact surface so as to be bonded together. More specifically, the emboss projections on the contact surface serve to bond only corresponding portions of the sheets to be bonded, while other portions of the contact surface press the sheets so as to maintain their shapes.

The present invention also provides a heat-bonding apparatus making use of a blade of one of the types mentioned above.

A first type heat-bonding apparatus of the present invention is designed to selectively conduct either a heat-bonding with cutting or a heat-bonding without cutting of the sheets.

Namely, the invention provides a heat seal roll apparatus which is composed of a heat roll having a heat-bonding blade on the outer peripheral surface thereof, and a support roll which is mounted rotatably such that a plurality of sheets of thermoplastic resin to be bonded can be clamped between the heat roll and the support roll. Preferably, the support roll has a peripheral surface which is contactable at its outer peripheral surface with the edge of the heat-bonding blade on the heat roll.

It is possible to cover the outer peripheral surface of the support roll with a heat-resistant elastic material so that the sheets can conveniently be held between the support roll and the pressing member. Examples of the material suitable for use as the heat-resistant elastic material covering the support roll are heat-resistant rubber, a heat-resistant elastomer, a heat-resistant elastic foaming member or the like.

The heat-bonding blade of the first type heat-bonding apparatus of the present invention, when used for cutting and heat-bonding of thermoplastic resin sheets, has to be heated to a temperature not lower than the melting point of the thermoplastic sheets. On the other hand, when the apparatus is used only for the purpose of heat bonding without cutting, the heat-bonding blade has to be heated to a temperature which is slightly lower than the temperature to which the blade is heated during the cutting/bonding. These temperatures are determined and changed according to the material of the sheet to be bonded.

In the heat seal roll apparatus as the first-type of welding apparatus of the present invention, the pressing member presses and holds the plurality of sheets of the thermoplastic resin sheets superposed in layers, so that the cutting and heat-bonding are conducted without fail. In addition, the feed of the sheet by the rotation of the roll can be effected smoothly without fail by virtue of the fact that the pressing member presses the sheet.

When the sheets are cut and heat-bonded at their edges, it is preferred that a take-up roll capable of taking-up the cut end portions of the sheets is used simultaneously with the operation of the apparatus.

A second-type heat-bonding apparatus of the present invention has the following features.

Namely, the apparatus employs the aforementioned first-type of heat-bonding blade and comprises a first temperature setting means capable of setting, when the apparatus is used for heat-bonding, the temperature of the blade at a level below that for the cutting, a second temperature setting means which is capable of setting the temperature of an anvil (lower blade) supporting the thermoplastic resin sheets at a level higher than that for the cutting, and a pressure setting means for setting the pressure exerted by the heat-bonding blade during heat-bonding at such a level that the thermoplastic resin sheets are not cut.

The temperature of the heat-bonding blade unit varies according to the kind of the thermoplastic resin sheets to be bonded, but the temperature of the blade when used for heat-bonding is preferably lower than the temperature of the same in the cutting/heat-bonding mode by a predetermined amount, e.g., 30° to 70° C., more preferably between the softening point of the thermoplastic resin sheets and the melting point of the same. On the other hand, the temperature of the anvil (lower blade) during the heat-bonding is preferably set at a level which is higher by a predetermined amount, preferably 70° to 100° C., than the temperature of the same in the cutting/heat-bonding mode. The pressure exerted by the blade is determined at such a level as not to cause the thermoplastic resin sheets to be cut. This pressure also is determined and changed in accordance with the physical properties of the thermoplastic resins sheets to be bonded.

Whether the thermoplastic resin sheets are cut and heat-bonded or merely heat-bonded is determined by the temperatures to which the blades are heated and the pressure exerted by the blade. For instance, it is possible to effect only the heat-bonding even when the blade has been heated to a level higher than the melting point of the thermoplastic resin sheet, provided that the pressure exerted by the blade is sufficiently low.

It is also possible to effect only the heat bonding by setting the temperature of the heat-bond blade to a level below the temperature of the anvil (lower blade) while determining the pressure exerted by the heat-bond blade at such a level as not to cause the thermoplastic resin sheets to be cut.

The heat-bond blade and heat-bond apparatus of the present invention can conveniently be used for various kinds of heat-bonding thermoplastic resin sheets and films, particularly sheets of non-woven cloth, more particularly sheets of spun-bond non-woven cloth sheets. It is possible to heat-bond such sheets of the same material, or sheets of different types and materials of thermoplastic resin may be bonded. Each of the sheets to be bonded may be a single-layered sheet or a laminate sheet. Bonding is also possible with a laminate sheet which includes a layer of a material other than a thermoplastic resin, e.g., an aluminum foil.

BRIEF DESCRIPTION OF THE DRAWINGS

FIGS. 1 to 4 are illustrations of embodiments of a first-type heat-bonding blade of the present invention in which:

FIG. 1 is a sectional view of a first example;
FIG. 2 is a sectional view of a second example;
FIG. 3 is a sectional view of a third example;
and
FIG. 4 is a sectional view of a fourth example.
FIGS. 9 to 11 are illustrations of embodiments of a second-type heat-bonding blade unit of the present invention, in which:

FIG. 9 is a sectional view of a fourth example;
FIG. 10 is a sectional view of a fifth example;
and
FIG. 11 is a plan view of a contact surface of the fifth example of the heat-bonding blade;
FIGS. 15 to 17 are illustrations of embodiments of a first-type heat-bonding apparatus of the present invention, in which:

FIG. 15 is a sectional view of a seventh example;
FIG. 16 is a sectional view of an eighth example;
and
FIG. 17 is a sectional view of a ninth example;
FIG. 21 is a conventional heat-plate type sealing blade.

DESCRIPTION OF THE PREFERRED EMBODIMENTS

Figure 5:
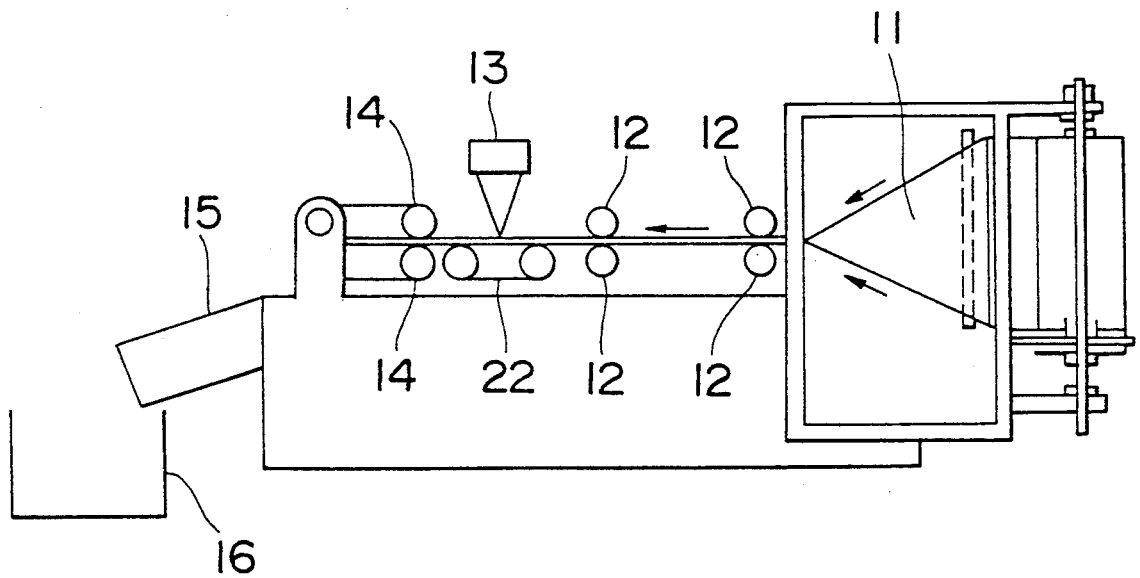
FIG. 5 is a schematic illustration of a sack producing apparatus employing the first-type of heat-bonding blade of the present invention.
Figure 6:
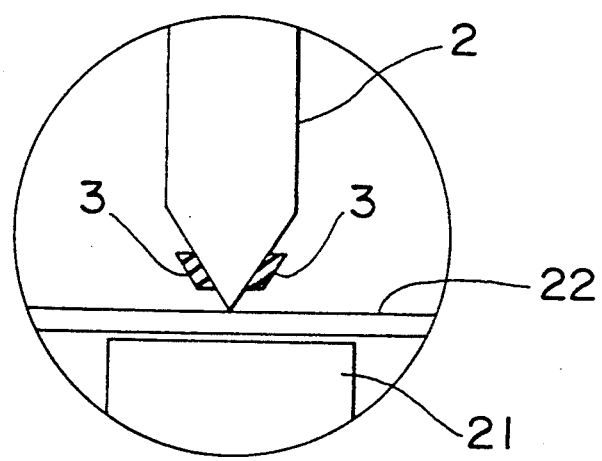
FIG. 6 is an enlarged view of a heat-bonded portion.

Preferred embodiments of the present invention will be described hereinafter with reference to the drawings. For an easier understanding of the present invention, the description will be first given of a sack producing apparatus which is shown in FIGS. 5 and 6.

In this sack producing apparatus, a sheet is folded double about a folding mandrel 11 and the folded sheet is fed into the nip between a pair of feed rolls 12,12 so that the folded portion constitutes the bottom of a sack. Then, in a subsequent heat-cutting/sealing section 13, the sheet is heat-cut and bonded so that both sides of the sack are sealed. The thus-formed sack is taken-up by the take-up roll 14 and ejected into a box 16 by means of a chute 15.

The heat-cutting/sealing section 13 has an anvil 21 which supports the sheets to be cut. An endless silicon belt conveyor is adapted to be moved along the anvil 21 so as to intermittently feed the laminated sheet. A heat-bonding blade 2 in accordance with the present invention is installed above the path of the sheet for cooperation with the anvil 21.

EXAMPLE 1

Figure 1:
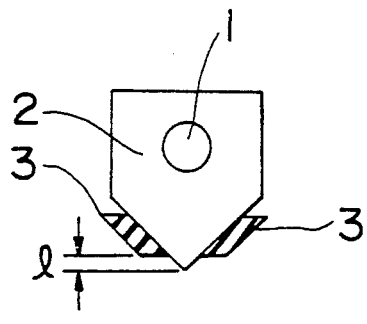
Figure 2:
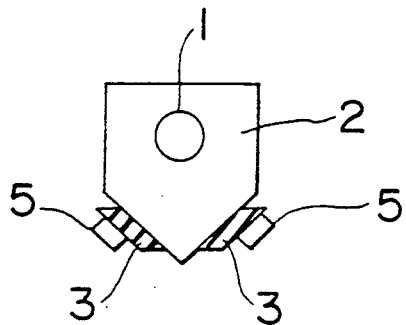

An example of the invention will be described in which a heat-bonding blade of the type shown in FIGS. 1 and 2 are attached to the sack producing apparatus of FIGS. 5 and 6.

As shown in FIG. 1, Example 1 of the first-type heat-bonding blade 2 of the present invention has a built-in type heater 1 provided therein. The blade has a cutting edge of an angle of 60° with a rounding work at a radius of 1 mm. A pressing member 3 is fixed to each side of the blade unit 2 along the cutting edge. The distance between the lower edge of the pressing member 3 and the cutting edge is so determined that when the cutting edge has cut into the thermoplastic resin sheets to be bonded, the pressing members 3 lightly press the thermoplastic resin sheets along the line of cut at both sides thereof.

Sacks were produced by using this heat-bonding blade 2 and the appearance after the cutting and heat-bonding and the welding strength were measured. Two types of sheets of different original sheet strengths were used. These sheets were polypropylene spun-bond non woven cloth sheets having long fibers of 2 denier, weight per unit area of 25.70 g/m$^2$ and thickness of 0.2 to 0.3 mm. Two of each of such sheets were superposed, heat-cut and then heat-bonded.

The results of the test production are shown in Table 1. In Table 1, the terms longitudinal and transverse represent, respectively, the direction of drawing off of the spun material fibers received and drawn by a movable trapping surface during production of a spun-bond non-woven cloth, and a direction perpendicular to the drawing direction. The seal effected by this apparatus is a "transverse seal" which is effected by setting the blade in a direction perpendicular to the above-mentioned transverse direction. In contrast, a term "longitudinal seal" is used to mean a seal which is effected by setting the blade in a direction perpendicular to the above-mentioned longitudinal direction.

EXAMPLE 2

As will be seen from FIG. 2, Example 2 of the heat-bonding blade has a construction material the same as that shown in FIG. 1 but features a cooling means 5 associated with the pressing member 3. The cooling means 5 is capable of externally cooling the pressing member 3 by means of a coolant pipe. Other portions are materially the same as those shown in FIG. 1. Test results also are shown in Table 1.

EXAMPLE 3

The heat-bonding blade unit 2 of the first type, explained in connection with FIG. 2, was also used in this Example. During the heat-bonding mode of the operation, the temperature of the heat-bonding unit 2 was set to be 175° C. by a first temperature setting means which is capable of setting the temperature of the blade 2 at a level lower than that in the heat-cutting/heat-bonding mode of operation. On the other hand, the temperature of the anvil (lower blade) for supporting the thermoplastic resin sheets was set to be 150° C. by a second temperature setting means which is capable of setting the temperature of the anvil (lower blade) 21 during the heat-bonding at a level higher than that in the cutting- /heat-bonding mode. At the same time, the pressure to be exerted by the heat-bonding blade is set to 1.0 kg/cm² by the pressure setting means which is capable of setting the pressure at such a level as not to cause the thermoplastic resin sheets to be cut. Using this apparatus, one of the double non-woven cloth sheet was pressed and heated for 0.7 second.

On the other hand, the other of the double non woven cloth sheet of Example 1 was heat-bonded for 0.7 second at a pressure of 1.0 kg/cm² while the temperature of the sealing blade and the temperature of the anvil 21 were set at 195° C. and 150° C., respectively. Good sealing strength was confirmed as shown in Table 1.

COMPARISON EXAMPLES 1 TO 4

Figure 7:
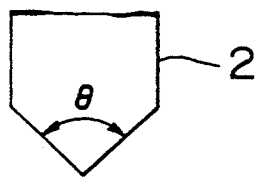
FIG. 7 is an illustration of a comparison example of the heat-bonding blade.

As Comparison Examples 1 to 4, sacks were formed by using different types of the heat-bonding blade 2. More specifically, Comparison Example 1 was formed by a heat-bonding blade of the same type as the blade 2 shown in FIG. 7, having a cutting edge angle θ of 80° with edge rounding work at a radius of 0.1 mm. Comparison Example 2 was formed by using the same type of heat-bonding blade as the blade 2 shown in FIG. 7, having a cutting edge angle θ of 80° with edge rounding work at a radius of 1.0 mm. Comparison Example 3 was formed by using the same type of heat-bonding blade as the blade 2 shown in FIG. 7, having a cutting edge angle θ of 60° with edge rounding work at a radius of 1.0 mm. Comparison Example 4 was formed by using a blade shown in FIG. 8. This blade had a horizontal surface portion 31 on the tip thereof, with an edge 32 of an edge angle of 30° suspended from the end of the horizontal surface, the tip of the edge 32 being rounded at a radius of 0.1 mm. The results are shown in Table 1. In Table 1, the pressing time longitude/transverse means the results of measurement of the strength of the heat bond effected by setting the blades of the respective Examples both in the longitudinal and transverse directions of the non-woven cloth. As will be understood from this table, these Comparison Examples are very far from providing heat-seal strengths equivalent to those of the invention of this application, even when the pressing time in the transverse direction is increased three times and even when the pressure is increased.

surface of the heat block, and heat-resistant rubber blocks fixed to both sides of the blade 2 to serve as the pressing members. Each heat-resistant rubber block has a large area of the lower surface and is provided therein with a coolant pipe as cooling means 5 extending therethrough.

Figure 3:
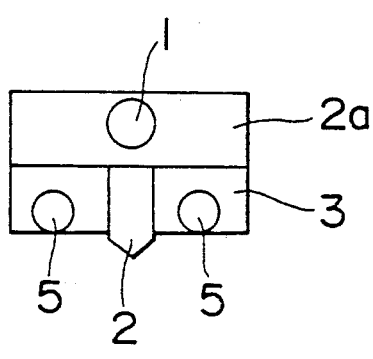
Figure 4:
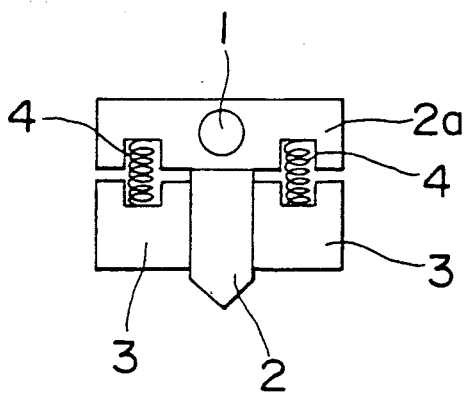

FIG. 4 shows another example in which the heat-resistant rubber blocks serving as pressing members 3 in the example shown in FIG. 3 are substituted by ceramic blocks. Springs as urging means 4 are disposed to act between the ceramic blocks and the heat block. Although not shown, it is possible to arrange such that pressing members are constituted by metallic plates secured to both sides of the blade and urged by springs towards the edge of the blade by means of springs.

EXAMPLE 4

Figure 9:
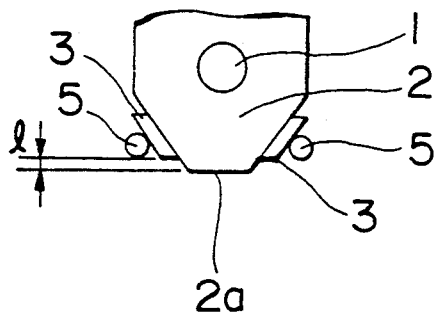
Figure 12:
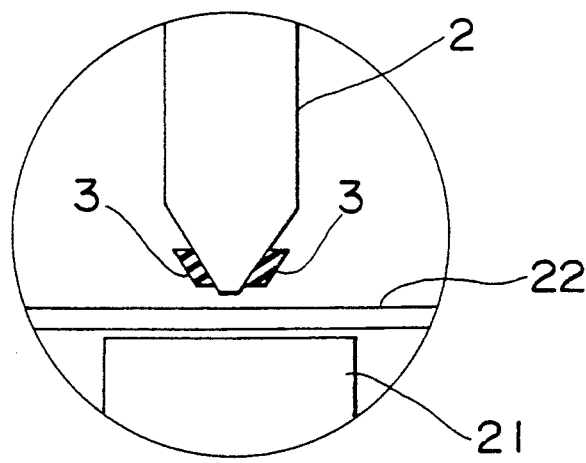
FIG. 12 is an enlarged view of the heat-bonding section of the apparatus.

As shown in FIG. 9, the fourth example of the heat-bonding blade of the invention, designed for the purpose of heat-bonding thermoplastic resin sheets without cutting them, has a built-in heater 1 and is provided with a flat contact surface 2a on the end thereof. At the same time, pressing members 3, 3 are fixed to both side surfaces of the cutting blade 2 along the cutting edge of the blade 2. The pressing members 3 are made of heat-resistant silicone rubber. The distance between the lower end of the pressing member 3 and the edge of the blade is determined such that the pressing members 3 are capable of lightly pressing a laminate of sheets of thermoplastic resin to be bonded at both sides of the edge of the blade, when the edge of the blade has cut into the laminate of the sheets. A cooling pipe 5 as cooling means is laid along each pressing member 3 and cooling water was circulated through this pipe.

Sacks were formed under the following conditions, by using the heat-bonding blade 2 of the type shown in FIG. 9, and the appearance and the strength of the seals were evaluated. Two types of original sheets having different strength levels, each being a polypropylene spun-bond non-woven cloth sheet of long fibers of 2 denier and having a weight per unit area of 25.70 g/m² and thickness of 0.2 to 0.3 mm, were used. Two sheets of each type were superposed and heat bonded to form a sack.

The results are shown in Table 2. In Table 2, terms

TABLE 1

| | Sheet 1 (original sheet strength longitude/transverse 9.2/1.4 kg/5 cm wide) | | | | | Sheet 2 (original sheet strength longitude/transverse 15.5/5.8 kg/5 cm wide) | | | | |
|---|---|---|---|---|---|---|---|---|---|---|
| | Set temp. (upper/ lower °C.) | Pressure (kg/cm²) | Pressing time (sec) longitude/ transverse | Heat seal strength (kg/5 cm wide) | | Set temp. (upper/ lower °C.) | Pressure (kg/cm²) | Pressing time (sec) longitude/ transverse | Heat seal strength (kg/5 cm wide) | |
| | | | | longitude | transverse | | | | longitude | transverse |
| Comp. Ex. 1 | 230/65 | 3.4 | 1.0/3.0 | 0.54 | 0.26 | 230/65 | 3.4 | 1.0/3.0 | 5.80 | 1.90 |
| Comp. Ex. 2 | " | " | " | 0.52 | 0.46 | " | " | " | 0.92 | 1.99 |
| Comp. Ex. 3 | " | " | " | 0.64 | 0.20 | " | " | " | 0.64 | 0.20 |
| Comp. Ex. 4 | " | " | " | 0.83 | 0.46 | " | " | " | 0.88 | 1.60 |
| Ex. 1 | 220/65 | 2.5 | 1.0 | 4.30 | 1.20 | 220/65 | 2.5 | 1.0 | 7.20 | 5.20 |
| Ex. 2 | 220/65 | 2.5 | 1.0 | 4.5 | 1.3 | 220/65 | 2.5 | 1.0 | 7.5 | 5.5 |

OTHER PRACTICAL EXAMPLES OF THE HEAT-CUTTING/BONDING BLADE

FIG. 3 shows an example of the heat-cutting/bonding blade of the invention which comprises, as shown in FIG. 3, a heat block having a built-in heater 1, a heat-bonding blade 2 suspended from the center of the lower "longitudinal" represents the direction of drawing off of the spun material fibers received and drawn by a movable trapping surface during production of a spun-bond non-woven cloth, while "transverse" represents the direction perpendicular to the direction of the drawing off. This apparatus effects "longitudinal seal", with the blade set in the direction perpendicular to the longitudinal direction as explained before. The sacks after the sealing showed attractive appearance.

EXAMPLE 5

Figure 10:
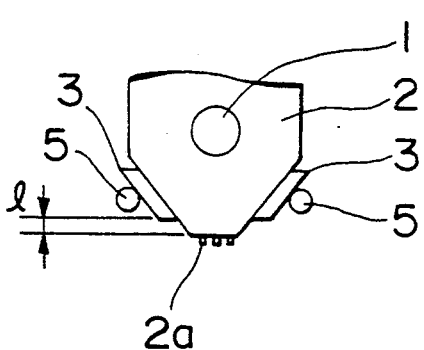

As shown in FIG. 10, the fifth example of the heat-bonding blade of the invention has a construction substantially the same as that shown in FIG. 9, except that the contact surface 2a is embossed to have a multiplicity of embossing projections 2b. Each of the embossing projections has a square pyramidal form cut at its top. This, the size of the cross-section of the emboss projection at its base portion is a in length and a in width, while the top surface is b in length and b in width. The height of the emboss projection is c. The contact surface 2a thus had a heat-bonding area ratio of 30%.

Other portions are materially the same as Example 4. The results are shown in Table 2. It will be seen that the heat-bonding is effected only at spots pressed by the emboss projections, while other portions of the contact surface merely serve to hold the sheets. The resin molten under the spots pressed by the emboss projections 2b flow into the regions devoid of the emboss projections 2b, whereby a seal with an attractive appearance can be obtained. In this Example, the pressing effect produced by the pressing members 3 and the effects produced by the emboss projections 2b in cooperation provide better appearance and higher sealing strength of the heat-bonded portions.

COMPARISON EXAMPLE 5

A sack was formed by using a conventional heat-bonding blade which is similar to that of Example 4 but lacks the pressing members 3 and the cooling means. The results are shown in Table 2. In Table 2, the pressing time longitude/transverse means the results of measurement of the strength of the heat bond effected by setting the blades of the respective Examples both in the longitudinal and transverse directions of the non-woven cloth. As will be understood from this table, this Comparison Example is very far from providing heat-seal strengths equivalent to those of the invention of this application, even when the pressing time in the transverse direction is increased three times and even when the pressure is increased.

a built-in heater 1 and has a flat contact surface 2a on the end of the blade. The contact surface 2a is embossed to have a multiplicity of embossing projections 2b. Each the embossing projection has a square pyramidal form cut at its top. This, the size of the cross-section of the emboss projection at its base portion is a in length and a in width, while the top surface is b in length and b in width. The height of the emboss projection is c. The contact surface 2a thus had a heat-bonding area ratio of 30%.

Figure 13:
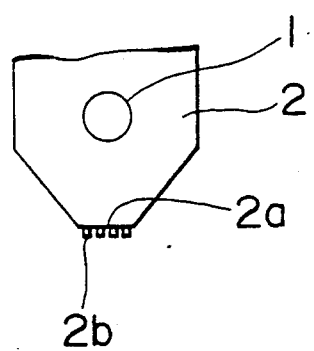
FIG. 13 is an illustration of an embodiment of a third-type heat-bonding apparatus of the present invention.
Figure 11:
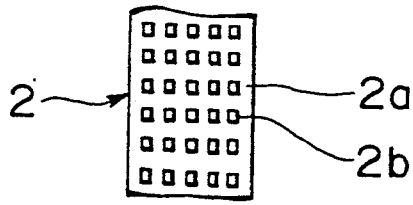
Figure 14:
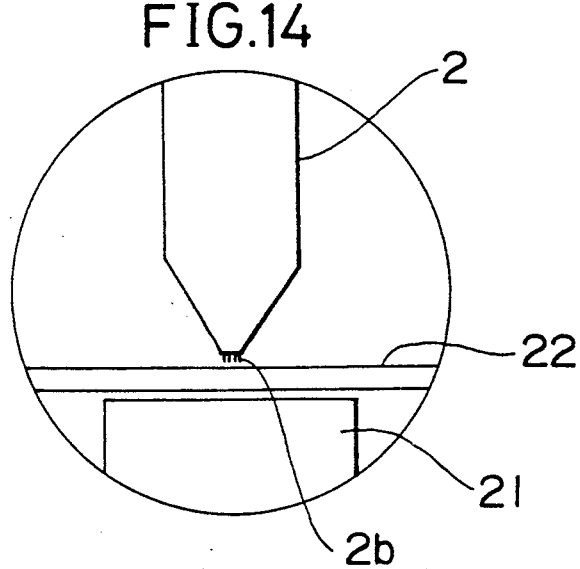
FIG. 14 is an enlarged view of the heat-bonding section of the embodiment.

Sacks were formed under the following conditions, by using the heat-bonding blade 2 of the type shown in FIG. 13, and the appearance and strength of the seal were evaluated. Two types of original sheets having different strength levels, each being a polypropylene spun-bond non-woven cloth sheet of long fibers of 2 denier and having a weight per unit area of 25.70 g/m$^2$ and thickness of 0.2 to 0.3 mm, were used. Two sheets of each type were superposed and heat bonded to form a sack.

The results are shown in Table 3. In Table 3, terms "longitudinal" represents the direction of drawing off of the spun material fibers received and drawn by a movable trapping surface during production of a spun-bond non-woven cloth, while "transverse" represents the direction perpendicular to the direction of the drawing off. This apparatus effects "longitudinal seal", with the blade set in the direction perpendicular to the longitudinal direction as explained before. The sacks after the sealing showed attractive appearance.

It will be seen that the heat-bonding is effected only at spots pressed by the emboss projections, while other portions of the contact surface merely serve to hold the sheets. The resin molten under the spots pressed by the emboss projections 2b flow into the regions devoid of the emboss projections 2b, whereby a seal with an attractive appearance can be obtained.

COMPARISON EXAMPLE 6

Sacks were formed by using a conventional heat-bonding blade which is of the same type as that shown in Example 4 except that the emboss projections 2b are not formed. The results are shown in Table 3. As will be understood from this table, this Comparison Example is very far from providing heat-seal strengths equivalent to those of the invention of this application, even when

TABLE 2

| | Sheet 1 (original sheet strength longitude/transverse 9.2/1.4 kg/5 cm wide) | | | | | Sheet 2 (original sheet strength longitude/transverse 15.5/5.8 kg/5 cm wide) | | | | |
| --- | --- | --- | --- | --- | --- | --- | --- | --- | --- | --- |
| | Set temp. (upper/ lower °C.) | Pressure (kg/cm$^2$) | Pressing time (sec) longitude/ transverse | Heat seal strength (kg/5 cm wide) | | Set temp. (upper/ lower °C.) | Pressure (kg/cm$^2$) | Pressing time (sec) longitude/ transverse | Heat seal strength (kg/5 cm wide) | |
| | | | | longitude | transverse | | | | longitude | transverse |
| Comp. Ex. 5 | 185/65 | 0.5 | 0.5 | 2.9 | 1.3 | 175/175 | 1.0 | 0.9 | 3.5 | 4.5 |
| Ex. 4 | 170/160 | 1.0 | 0.5 | 4.0 | 1.6 | 175/175 | 1.5 | 1.2 | 5.9 | 4.5 |
| Ex. 5 | 180/160 | 1.0 | 0.5 | 3.0 | 1.6 | 180/180 | 1.5 | 1.2 | 4.5 | 4.5 |

EXAMPLE 6

As shown in FIG. 13, the heat-bonding blade 2 of Example 6, designed for non-cutting heat-bonding, has the pressing time in the transverse direction is increased three times and even when the pressure is increased.

TABLE 3

| | Sheet 1 (original sheet strength longitude/transverse 9.2/1.4 kg/5 cm wide) | | | | | Sheet 2 (original sheet strength longitude/transverse 15.5/5.8 kg/5 cm wide) | | | | |
|---|---|---|---|---|---|---|---|---|---|---|
| | Set temp. (upper/ lower °C.) | Pressure (kg/cm²) | Pressing time (sec) longitude/ transverse | Heat seal strength (kg/5 cm wide) | | Set temp. (upper/ lower °C.) | Pressure (kg/cm²) | Pressing time (sec) longitude/ transverse | Heat seal strength (kg/5 cm wide) | |
| | | | | longitude | transverse | | | | longitude | transverse |
| Comp. Ex. 6 | 185/65 | 0.5 | 0.5 | 2.5 | 1.3 | 175/175 | 1.0 | 0.9 | 3.5 | 4.5 |
| Ex. 6 | 180/160 | 1.0 | 0.5 | 3.0 | 1.6 | 180/180 | 1.5 | 1.2 | 4.5 | 4.5 |

Figure 18:
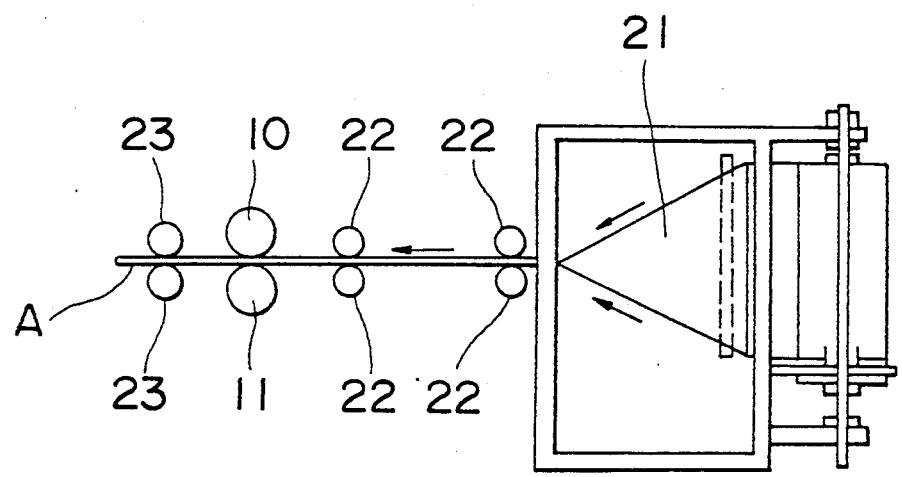
FIG. 18 is a schematic illustration of a first-type heat-bonding apparatus.

Embodiments of the first-type heat-bonding apparatus of the present invention will be described with reference to FIGS. 15 to 18. FIGS. 15 to 18 show examples of the first-type heat-bonding apparatus, while FIG. 18 shows a sack producing apparatus incorporating the heat-rolling apparatus of one of those shown in FIGS. 15 to 17.

For the purpose of an easier understanding of the present invention, a description will be given first of the sack producing apparatus with reference to FIG. 18. In the operation of this sack producing apparatus, a web-like sheet A is folded double by means of a folding mandrel 21 and the folded sheet is supplied into the nip between a pair of feed rolls 22 and 22 such that the folded portion constitutes one lateral side of the sack. Subsequently, the opposing ends of the folded sheet are heat-bonded so that a tubular sack is formed. This tubular sack is taken-up by means of a take-up roll 23 and delivered to the next sack-filling step. The embodiments will be described hereinunder.

EXAMPLE 7

As shown in FIG. 15, a heat-bonding apparatus has a heat roll 1 for heat-cutting and bonding a sheet A to be heat-cut and bonded, and an anvil roll 11 opposing the heat roll 1 and capable of feeding a sheet A in the direction of rotation of the heat roll 1. The anvil roll 11 is made of a metal and its outer peripheral surface is coated with a heat-resistant rubber 12. The heat roll 1 having a heat-bonding blade 2 is disposed above the anvil roll 11. The anvil roll 1 is capable of continuously feeding the laminate sheet A to be formed into a sack, in the direction of rotation of the heat roll 1.

The heat-bonding blade 2 incorporates a built-in heater (not shown). The edge of the blade 2 has an edge angle of 60° with a rounding work at a radius of 1 mm. Pressing members 3 are fixed to both slant side surfaces of the heat-bonding blade 2 so as to extend along the edge of the blade member. The pressing members 3 are made of heat-resistant rubber. The distance between the lower end of the pressing member 3 and the edge of the blade is determined such that the pressing members 3 can lightly press the laminate thermoplastic resin sheet A.

Sacks were formed under the following conditions, by using the heat-bonding blade 2 of the type shown in FIG. 15, and the appearance and strength of the seal were evaluated. Two types of original sheets having different strength levels, each being a polypropylene spun-bond non-woven cloth sheet of long fibers of 2 denier and having a weight per unit area of 25.70 g/m² and thickness of 0.2 to 0.3 mm, were used. Two sheets of each type were superposed and heat-bonded to form a sack. The results are shown in Table 4. In Table 4, terms "longitudinal" represents the direction of drawing off of the spun material fibers received and drawn by a movable trapping surface during production of a spun-bond non-woven cloth, while "transverse" represents the direction perpendicular to the direction of the drawing off. This apparatus effects "longitudinal seal", with the blade set in the direction perpendicular to the longitudinal direction as explained before. The sacks after the sealing showed attractive appearance.

EXAMPLE 8

Figure 8:
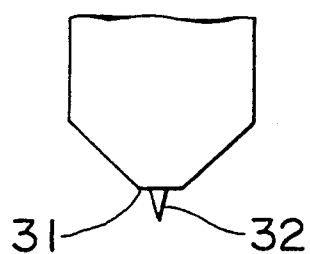
FIG. 8 is an illustration of another example.

FIG. 8 shows an eighth example. This example is basically the same as that of FIG. 13 except that the pressing member 3 has a cooling means 5 which includes a cooling water pipe for externally cooling the pressing member 3. Other portions are materially the same as those of Example 7. The results also are shown in Table 4.

COMPARISON EXAMPLE 6

Figure 19:
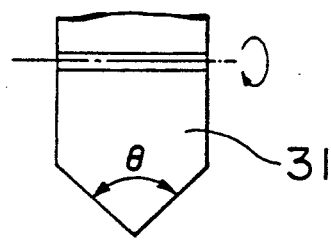
FIG. 19 is an illustration of a comparison example of a melt-cut sealing blade.
Figure 20:
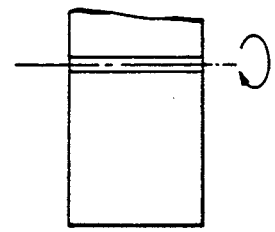
FIG. 20 is an illustration of another comparison example.

Heat-sealing was conducted by using a heat roll shown in FIG. 19 having a heat-bonding blade 31 with a cutting edge angle of 80°, as well as a heat-plate roll shown in FIG. 20 having a flat outer peripheral surface. The results are shown in Table 4.

EXAMPLE 9

FIG. 17 shows a ninth example which comprises a heat roll 1 composed of a disk-type heat block having a built-in heater (not shown), a heat-bonding blade 2 provided on the outer peripheral surface of the heat roll 1, and heat-resistant rubber blocks serving as pressing members 3 secured to both sides of the heat-bonding blade 2. Each heat-resistant rubber block 3 had an under surface of a large area and is provided with a cooling water 5 which extends through the block so as to serve as cooling means.

EXAMPLE 10

Sacks were formed in the same manner as Example 7 except that the heat-plate seal was conducted with comparatively low levels of heating temperature and pressure. The results are shown in Table 4.

TABLE 4

| | Roll set temp. upper/lower Unit: °C. | Pressure (kg/cm²) | Pressing time (sec) | Bonding strength (kg/5 cm wide) | |
|---|---|---|---|---|---|
| | | | | 25 g/m² | 70 g/m² |
| Original sheet strength (kg/5 cm wide) | — | — | — | 4.5 | 16.0 |
| Example 7 (melt-cut seal) | 260/65 | 1.5 | 0.7 | 4.0 | 10.0 |

TABLE 4-continued

| | Roll set temp. upper/lower Unit; °C. | Pressure (kg/cm²) | Pressing time (sec) | Bonding strength (kg/5 cm wide) | |
|---|---|---|---|---|---|
| | | | | 25 g/m² | 70 g/m² |
| Example 8 (melt-cut seal) | 260/65 | 1.5 | 0.7 | 4.5 | 12.5 |
| Example 10 (heat-plate seal) | 175/150 | 1.0 | 0.7 | 4.0 | 9.5 |
| Comparison example 6 (melt-cut blade) | 260/65 | 1.5 | 0.7 | 0.5 | 1.0 |
| Comparison example 6 (heat plate roll) | 175/150 | 1.0 | 0.7 | 1.0 | 1.5 |

In the first type heat-bonding blade of the invention intended for heat-cutting and bonding thermoplastic resin sheets, the pressing members effectively press the sheet even when the sheets are bulky non-woven cloth sheets, so as to keep the fibers of the cloth in compacted condition along the line of cutting. This type of blade, therefore, is suitable for heat cutting and bonding two or more sheets of polypropylene non-woven cloth, as well as multi-layered sheets having a non-woven cloth as a constituent, not to mention ordinary thermoplastic resin sheets, thus making it possible to obtain attractive appearance of the seal and high seal strength.

In the second type heat-bonding blade of the invention intended for heat-bonding thermoplastic resin sheets without cutting, the pressing members effectively press the sheets even when the sheets are bulky non-woven cloth sheets, so as to keep the fibers of the cloth in compacted condition along the line of bonding. This type of blade, therefore, is suitable for heat-bonding two or more sheets of non-woven cloth, as well as multi-layered sheets having a non-woven cloth as a constituent, not to mention ordinary thermoplastic resin sheets, thus making it possible to obtain attractive appearance of the seal and high seal strength. These effects are enhanced by providing emboss projections on the contact surface.

In the third-type heat-bonding blade intended for heat-bonding thermoplastic resin sheets without cutting, the sheets are heat-bonded only at spots corresponding to the emboss projections while other portions of the contact surface on the blade merely hold the sheets. In consequence, the resin molten under the spots is made to flow into the regions devoid of the emboss projections, thus offering excellent appearance and high bonding strength. In particular, this type of blade provides superior effect when used for heat-bonding of non-woven cloth sheets.

In the first type heat-bonding apparatus of the invention, the pressing members effectively press the sheets even when the sheets are bulky non woven cloth sheets, so as to keep the fibers of the cloth in compacted condition along the line of cutting. This type of apparatus, therefore, is suitable for use in producing sacks by heat-cutting and bonding two or more sheets of polypropylene non-woven cloth, as well as multi-layered sheets having a non-woven cloth as a constituent, not to mention ordinary thermoplastic resin sheets, thus making it possible to obtain attractive appearance of the seal and high seal strength. In addition, this type of apparatus also can operate in a mode for heat-bonding thermoplastic resin sheets without cutting them.

In the second type heat-bonding apparatus of the invention, the pressing members effectively press the sheets even when the sheets are bulky non-woven cloth sheets, so as to keep the fibers of the cloth in compacted condition along the line of cutting. This type of apparatus, therefore, is suitable for use in heat-bonding, without cutting, two or more sheets of polypropylene non-woven cloth, as well as multi-layered sheets having a non-woven cloth as a constituent, not to mention ordinary thermoplastic resin sheets, thus making it possible to obtain attractive appearance of the seal and high seal strength.

What is claimed is:

1. A heat-bonding blade having an edge for heat-bonding two or more thermoplastic resin sheets superposed on one another without heat-cutting them, the edge of said blade being provided with a contact surface contactable with the uppermost one of said thermoplastic resin sheets, said contact surface being embossed so as to have a multiplicity of emboss projections wherein the bonding area ratio given by the following formula ranges between 20 and 90%

{(total area of emboss projections)/(total area of contact surface)} × 100 and wherein said blade comprises a pressing member having a lower end and which is provided on at least one side of said blade, the distance between the lower end of said at least one pressing member and the edge of said blade being so determined that said at least one pressing member lightly presses said thermoplastic resin sheets sufficiently to cause heat-bonding when said edge of said blade is pressed into said sheets, so that said sheets are pressed at a predetermined pressure by said at least one pressing member during heat-bonding.

2. A heat-bonding apparatus comprising a rotatable heat roll heated by a heater provided on the outer periphery thereof with at least one heat-bonding blade and a rotatable anvil roll for cooperating with said heat roll so as to clamp therebetween a plurality of superposed thermoplastic resin sheets to be heat-bonded together, wherein said heat-bonding blade has an edge providing a contact surface contactable with the uppermost one of the superposed thermoplastic resin sheets, said contact surface being embossed to have a multiplicity of emboss projections and wherein said blade comprises a pressing member having a lower end and which is provided at least on one side of said blade, the distance between the lower end of said at least one pressing member and the edge of said blade is set so that said pressing member lightly presses said thermoplastic resin sheets sufficiently to cause heat bonding when said edge of said blade is pressed into said sheets so that said sheets are pressed at a predetermined pressure by said at least one pressing member during heat-bonding.

3. A heat-bonding apparatus comprising a rotatable heat roll heated by a heater provided on the outer periphery thereof with at least one heat-bonding blade having an edge, and a rotatable anvil roll for cooperating with said heat roll so as to clamp therebetween a plurality of superposed thermoplastic resin sheets including at least a lower sheet and an upper sheet, to be heat bonded together, wherein said blade comprises at least one pressing member having a lower end, said at least one pressing member being provided at least on one side of each said blade, wherein the distance between the lower end of said at least one pressing member and the edge of said blade is such that said at least one pressing member lightly presses said thermoplastic resin sheets sufficiently to cause heat bonding when said edge of said blade is pressed into said sheets, so that said sheets are pressed at a predetermined pressure by said at least one pressing member during heat bonding, and said at least one pressing member comprising a heat-resistant material and is mounted for movement towards and away from the edge of said blade, said blade further comprising a means for urging said at least one pressing member towards said edge of said blade.

4. A heat-bonding apparatus comprising a rotatable heat roll heated by a heater provided on the outer periphery thereof with at least one heat-bonding blade having an edge, and a rotatable anvil roll for cooperating with said heat roll so as to clamp therebetween a plurality of superposed thermoplastic resin sheets including at least a lower sheet and an upper sheet to be heat bonded together, wherein said blade comprises a pressing member having a lower end and which is provided at least on one side of said blade wherein the distance between the lower end of said at least one pressing member and the edge of said blade is so determined that said at least one pressing member lightly presses said thermoplastic resin sheets sufficiently to cause heat bonding when said edge of said blade is pressed into said sheets, so that said sheets are pressed at a predetermined pressure by said at least one pressing member during heat bonding, said at least one pressing member being positioned for movement towards and away from the edge of said blade, and said blade further comprising means for fixing said at least one pressing member at a predetermined position.

5. A heat-bonding apparatus according to claim 3 or 4 wherein said anvil roll is covered at its outer peripheral surface with a heat-resistant elastic material.

6. A heat-bonding apparatus according to claim 3 or 4 wherein said pressing member is provided on each side of said blade.

7. A heat-bonding apparatus according to one of claims 3 or 4, wherein said at least one pressing member comprises a heat-resistant elastic material capable of adapting to a variety of thicknesses of the superposed sheets by its elasticity.

8. A heat-bonding apparatus according to claim 3 or 4 further comprising means for cooling said at least one pressing member.

9. A heat-bonding apparatus according to claim 3 or 4 wherein said blade is designed to heat-bond said thermoplastic resin sheets but not to heat-cut these sheets, and is provided with a contact surface which is capable of contacting the upper sheet of said thermoplastic resin sheets.

10. A heat-bonding apparatus according to claim 3 or 4 wherein said blade comprises a contact surface having a multiplicity of emboss projections.

11. A heat-bonding apparatus according to claim 10 wherein the bond surface ratio of said contact surface which is defined by the following formula {(total area of emboss projections)/(total area of contact surface)} × 100 ranges from 30 to 60%.

12. A heat-bonding blade comprising a blade member having an edge which is heated by a heater and which heat-bonds a plurality of thermoplastic resin sheets superposed one on another, a pressing member having a lower end which is provided at least on one side of said blade member, wherein the distance between the lower end of said pressing member and the edge of said blade member being so determined that said pressing member lightly presses said thermoplastic resin sheets when said edge of said blade member is pressed into said sheets, so that said sheets are pressed at a predetermined pressure by said at least one pressing member during heat-bonding, and cooling means for cooling said pressing member, and wherein said at least one pressing member is made of a heat-resistant elastic member so that it can adapt itself to a variety of thicknesses of the superposed sheets by its elasticity.

13. A heat-bonding blade having an edge which is heated by a heater and which is capable of heat-bonding a plurality of thermoplastic resin sheets superposed one on another, said blade comprising a pressing member having a lower end which is provided at least on one side of said blade, said pressing member being comprised of a heat-resistant elastic member so that it can adapt itself to a variety of thicknesses of the superposed sheets by its elasticity, wherein the distance between the lower end of said pressing and the edge of said blade member is such that said pressing member lightly presses said thermoplastic resin sheets sufficient to cause heat bonding when said edge of said blade is pressed into said sheets, so that said sheets are pressed at a predetermined pressure by said at least one pressing member during heat-bonding, cooling means for cooling said pressing member and means for moving said at least one pressing member for movement towards and away from the edge of said blade, and said blade further comprising means for fixing said at least one pressing member at a predetermined position.

14. A heat-bonding blade according to claim 12 or 13 wherein said at least one pressing member is provided on each side of said blade member.

15. A heat-bonding blade according to claim 12 or 13, wherein said blade is designed to heat-bond said thermoplastic resin sheets but not to heat-cut these sheets, and is provided with a contact surface which is capable of contacting the upper sheet of said thermoplastic resin sheets.

16. A heat-bonding blade according to claim 15, wherein said contact surface is embossed to have a multiplicity of emboss projections.

17. A heat-bonding blade according to claim 16, wherein the bonding area ratio given by the following formula ranges between 20 and 90%.

{(total area of emboss projections)/(total area of contact surface)} × 100.

18. A heat-bonding apparatus having a heat-bonding blade which is capable of heat-cutting two or more superposed thermoplastic resin sheets and heat-bonding said sheets together, said apparatus comprising a heat-bonding blade comprising a blade member having an edge which is heated by a heater and which heat-bonds a plurality of thermoplastic resin sheets superposed one on another, a pressing member having a lower end which is provided at least on one side of said blade member, wherein the distance between the lower end of said pressing member and the edge of said blade member being so determined that said pressing member lightly presses said thermoplastic resin sheets when said edge of said blade member is pressed into said sheets, so that said sheets are pressed at a predetermined pressure by said at least one pressing member during heat-bonding and wherein said at least one pressing member is made of a heat-resistant elastic member so that it can adapt itself to a variety of thicknesses of the superposed sheets by its elasticity, first temperature setting means capable of setting the temperature of said heat-bonding blade during the heat-bonding to a level which is lower than the temperature of said heat-bonding blade during heat-cutting, second temperature setting means for setting the temperature of an anvil member supporting said thermoplastic resin sheets during heat-bonding to a level which is higher than the temperature of said anvil member during the heat-cutting; and pressure setting means for setting the pressure of said heat-bonding blade to such a level as not to cause said thermoplastic resin sheets to be cut.

* * * * *